United States Patent
Drotar et al.

(10) Patent No.: US 10,118,452 B2
(45) Date of Patent: Nov. 6, 2018

(54) MOTOR VEHICLE WHEEL SUSPENSION

(71) Applicant: Ford Global Technologies, LLC, Dearborn, MI (US)

(72) Inventors: Timothy Drotar, Commerce Township, MI (US); Ralf Hintzen, Aachen (DE); Daniel Mainz, Herzogenrath (DE); Paul Zandbergen, Würselen (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 15/485,808

(22) Filed: Apr. 12, 2017

(65) Prior Publication Data

US 2017/0297396 A1   Oct. 19, 2017

(30) Foreign Application Priority Data

Apr. 14, 2016  (DE) .................. 10 2016 206 220

(51) Int. Cl.
*B60G 3/20* (2006.01)
*B60G 7/00* (2006.01)
(Continued)

(52) U.S. Cl.
CPC .............. *B60G 3/20* (2013.01); *B60G 7/008* (2013.01); *B60G 7/02* (2013.01); *B60G 11/14* (2013.01); *B60G 13/003* (2013.01); *B60G 13/005* (2013.01); *B60G 15/02* (2013.01); *B60G 21/0551* (2013.01); *B60G 2200/156* (2013.01); *B60G 2202/12* (2013.01); *B60G 2202/135* (2013.01); *B60G 2204/128* (2013.01); *B60G 2204/129* (2013.01);
(Continued)

(58) Field of Classification Search
CPC ........ B60G 3/20; B60G 7/008; B60G 13/005; B60G 13/003; B60G 15/02; B60G 11/14; B60G 7/02; B60G 21/0551; B60G 2202/12; B60G 2200/156; B60G 2204/1244; B60G 2204/128; B60G 2202/135; B60G 2204/61; B60G 2204/143; B60G 2204/129; B60G 2204/148

See application file for complete search history.

(56) References Cited

U.S. PATENT DOCUMENTS 4,370,005 A * 1/1983 Sarai .................. F16F 1/3814
                                                        384/154
4,458,913 A   7/1984 Rumpel
(Continued)

FOREIGN PATENT DOCUMENTS

| DE | 102008037925 A1 | 2/2010 |
| EP | 1937498 A1 | 7/2008 |
| EP | 1738939 B1 | 3/2010 |

*Primary Examiner* — Drew J Brown
(74) *Attorney, Agent, or Firm* — Raymond L. Coppiellie; Burgess Law Office, PLLC (57) ABSTRACT

A wheel suspension for a motor vehicle including a wheel carrier supporting a wheel. The wheel carrier connected via at least one upper camber link, a lower control arm, and a lateral toe link to the vehicle body or subframe. A stabilizer rod connects to the wheel carrier. The wheel suspension including a damper unit and a spring unit wherein the stabilizer rod and the damper unit connect to the wheel carrier at a common connecting point.

15 Claims, 6 Drawing Sheets

(51) Int. Cl.
*B60G 7/02* (2006.01)
*B60G 11/14* (2006.01)
*B60G 13/00* (2006.01)
*B60G 15/02* (2006.01)
*B60G 21/055* (2006.01)

(52) U.S. Cl.
CPC ............ *B60G 2204/1244* (2013.01); *B60G 2204/143* (2013.01); *B60G 2204/148* (2013.01); *B60G 2204/61* (2013.01)

(56) References Cited

U.S. PATENT DOCUMENTS

| | | | | |
|---|---|---|---|---|
| 4,542,920 A | * | 9/1985 | Kijima | B60G 3/205 267/190 |
| 4,583,759 A | * | 4/1986 | Kami | B60G 3/20 280/124.136 |
| 4,840,396 A | * | 6/1989 | Kubo | B60G 3/202 280/124.143 |
| 5,048,860 A | | 9/1991 | Kanai et al. | |
| 5,415,427 A | * | 5/1995 | Sommerer | B60G 3/20 280/124.135 |
| 7,896,372 B2 | * | 3/2011 | Yanagida | B60G 3/20 280/124.135 |
| 8,267,416 B2 | | 9/2012 | Allen et al. | |
| 8,408,568 B2 | | 4/2013 | Yanagida | |
| 8,690,177 B2 | * | 4/2014 | Buchwitz | G06F 17/30424 280/124.125 |
| 8,708,359 B2 | | 4/2014 | Murray | |
| 2003/0168827 A1 | * | 9/2003 | La | B60G 15/063 280/124.135 |
| 2005/0253353 A1 | * | 11/2005 | Yamamura | B60G 3/20 280/124.135 |
| 2009/0160154 A1 | * | 6/2009 | Frasch | B60G 3/20 280/124.143 |
| 2010/0276896 A1 | * | 11/2010 | Sano | B60G 17/0152 280/5.509 |
| 2013/0113177 A1 | * | 5/2013 | Seethaler | B60G 3/06 280/124.145 |
| 2015/0151598 A1 | * | 6/2015 | Bruehl | B60G 3/20 280/86.756 |
| 2015/0183286 A1 | * | 7/2015 | Bruehl | B60G 3/20 280/124.135 |
| 2018/0111432 A1 | * | 4/2018 | Drotar | B60G 3/20 |

* cited by examiner

MOTOR VEHICLE WHEEL SUSPENSION

CROSS-REFERENCE TO RELATED APPLICATIONS

Not Applicable.

BACKGROUND OF THE INVENTION

1. Field of the Invention

The invention relates to a wheel suspension for a motor vehicle.

2. Description of Related Art

Motor vehicle wheel suspensions often include a movable connection between the vehicle body or subframe and the wheels that constitutes an essential part of vehicle technology as the suspension assists with driving behavior and a high degree of driving comfort. Typically, a wheel attaches to a wheel carrier that connects through various links and joints to the vehicle body. Springs and shock absorbers also form part of the wheel suspension. These components designed and connected together in different ways to fulfill the aforementioned requirements for a wheel suspension.

Integral suspensions for rear axles of motor vehicles having suitable properties relative to vehicle dynamics and NVH behavior are known. Such rear axle suspensions, are often heavier and more expensive than other designs. However, the field of wheel suspensions for motor vehicles provides further room for improvement. For example, a wheel suspension for the rear wheels of motor vehicles designed in a simple and cost-effective manner.

SUMMARY OF THE INVENTION

A wheel suspension for a motor vehicle, wherein the suspension includes a wheel carrier, and an upper camber link, a lower control arm, and a lateral toe link connected between the wheel carrier and a vehicle body or subframe. The suspension including a horizontally extending stabilizer rod. A damper and a spring unit wherein the stabilizer rod and the damper unit connect to the wheel carrier at a common point. The upper camber link is located between the spring unit and a drive shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the various figures, the same parts are always provided with the same reference numerals, which is why these parts are generally only described once.

Figure 4:
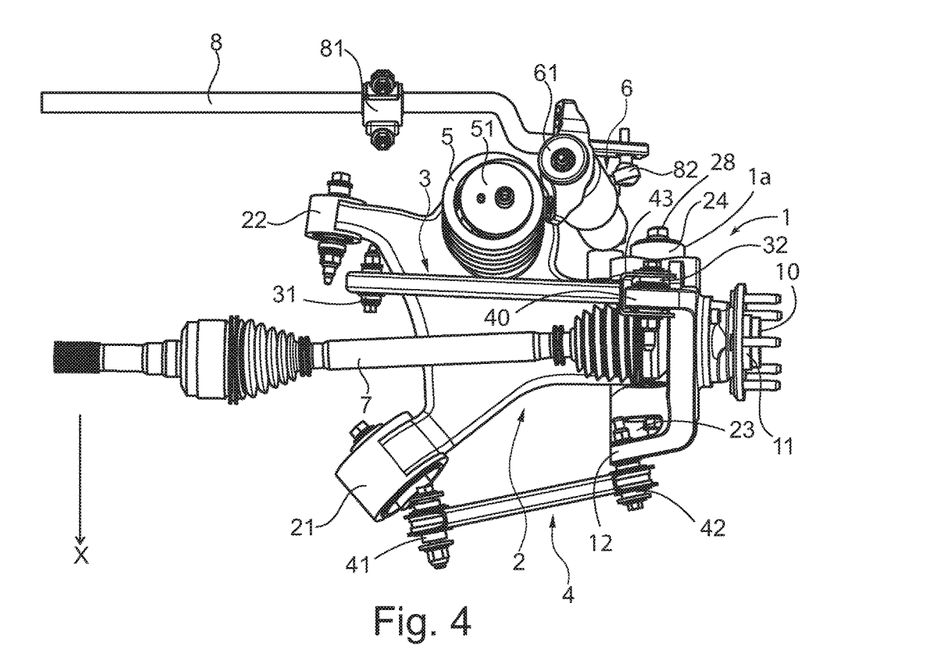
FIG. 4 is a plan view of the suspension of FIG. 1.

The wheel suspension shown in the figures carries a left rear wheel of a motor vehicle (not shown). The right rear wheel may be suspended in a similar manner. This opposing side, however, is not shown in the figures. The direction of travel of the motor vehicle is indicated in FIG. 4 by an arrow X. In this case, the direction of travel is the forward direction.

The wheel suspension is connected to the vehicle body or subframe (not shown). The suspension includes a wheel carrier 1 connected, via a plurality of links 2, 3, 4, to the vehicle body or subframe. As illustrated, the three links include a lower control arm 2, an upper camber link 3, and a lateral toe link 4. The connection between the wheel carrier 1 and the links 2, 3, 4 typically including rubber bearing bushings or ball joints. As illustrated herein the corresponding connecting elements are typically pressed into the links 2, 3, 4 and/or the wheel carrier 1 and are connected by screws and nuts to their respective component.

The lower control arm 2 connects via two joints 21, 22 to the vehicle body or subframe, wherein the two joints 21, 22 are pressed into cylindrical, connection portions 2a, 2b located on one and or side of the lower control arm 2. The opposite end or side of the lower control arm 2 connects to the wheel carrier 1 via two joints 23, 24, which in turn are pressed into apertures 1a, 1b located in the wheel carrier 1. In the exemplary embodiment, the two joints 23, 24 connect via a single bolt 28 to the lower control arm 2. As shown, for example, in FIG. 3, the joints 23, 24 are located below a hub and wheel bearing unit 11 of the wheel carrier 1.

The upper camber link 3 connects via a joint 31 to the vehicle body or subframe, wherein the joint 31 is pushed into the upper camber link 3. The camber link 3 connects to the wheel carrier 1 via a joint 32 pushed either into the camber link 3 or into the wheel carrier 1. The joint 32 located in a region above the hub and wheel bearing unit 11. As illustrated, the wheel carrier 1 having an upwardly protruding projection 40, the camber link 3 mounted thereon via the joint 32. The end of the upper camber link 3 may have a fork shape 43 and may encompass a projection of the wheel carrier 1.

Figure 3:
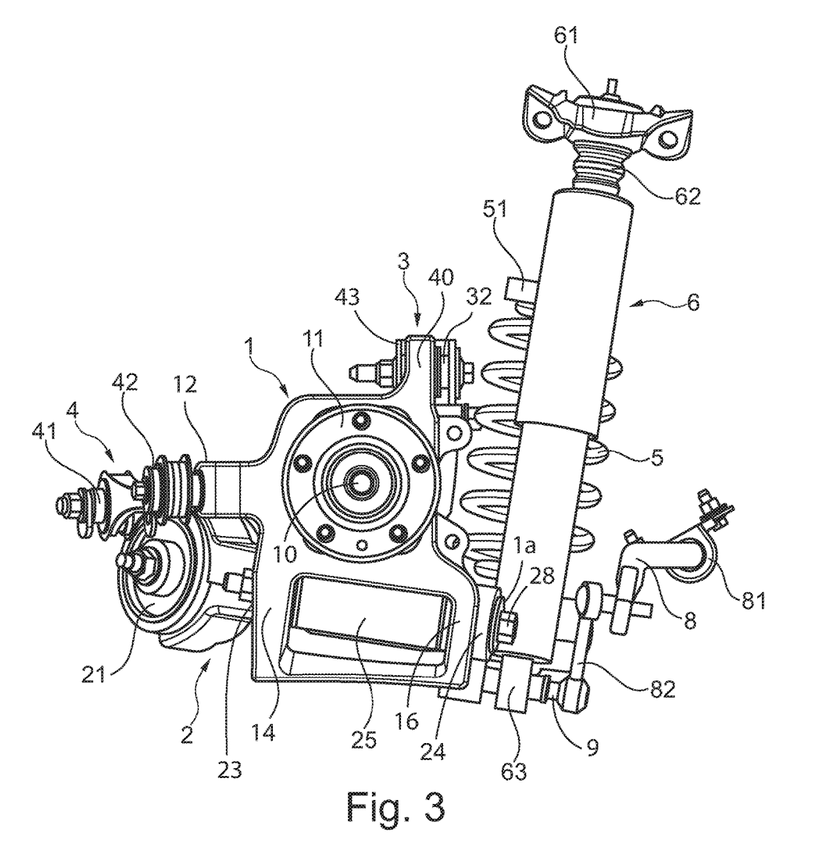
FIG. 3 is a side view of the suspension of FIG. 1.
Figure 6:
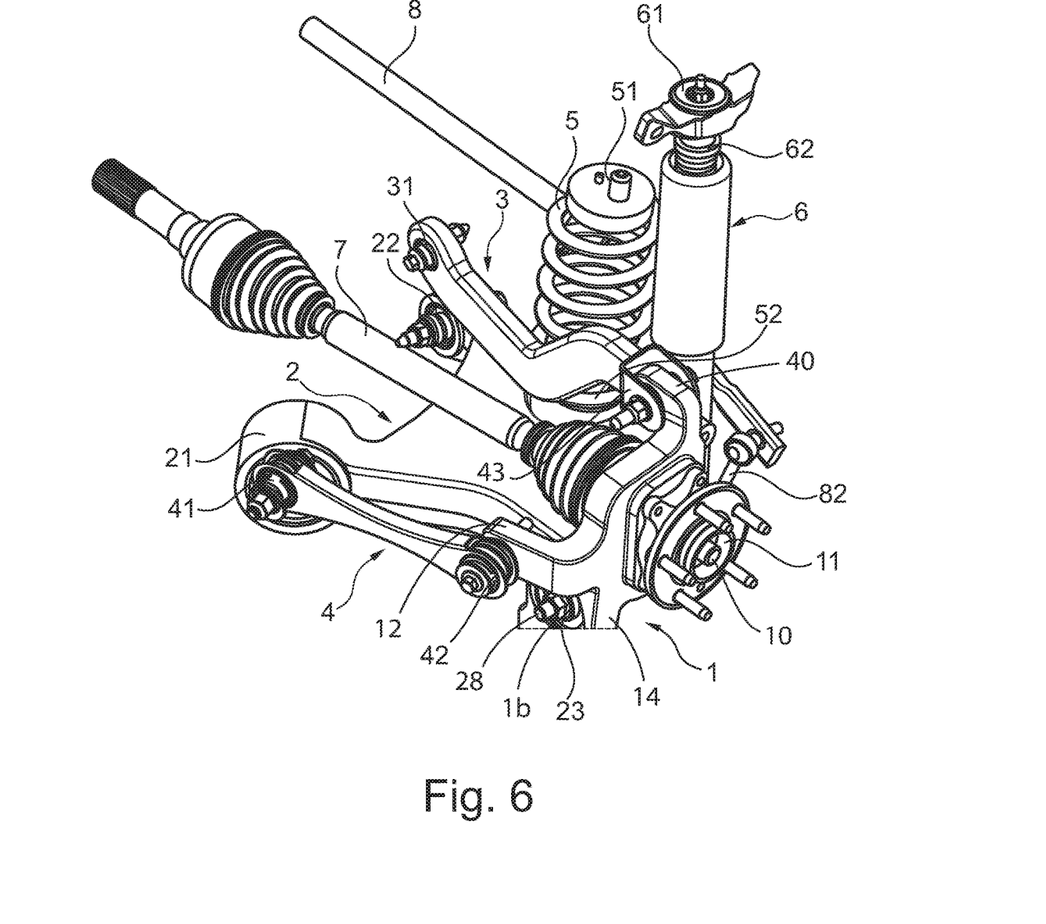
FIG. 6 is a perspective view from above of the suspension of FIG. 1.

The lateral toe link 4 connects via a joint 41 to the bodywork or a subframe, wherein the joint 41 is pushed into the lateral toe link 4. The lateral toe link 4 connects to the wheel carrier 1 via a joint 42 either pushed into the lateral toe link 4 or into the wheel carrier 1. As shown in FIG. 3, for example, the joint 42 is approximately level with the hub and wheel bearing unit 11. In the disclosed embodiment, the joint 42 connects to or engages a projection 12 protruding from the wheel carrier 1. FIGS. 4 and 6 illustrate the projection 12 protruding laterally from the wheel carrier 1, i.e. in a direction away from the drive shaft 7. The lateral toe link 4 extends above the lower control arm 2 in the direction of the drive shaft 7.

The wheel suspension also includes a spring unit, that may be a spiral spring 5. This spiral spring 5 positioned between the lower control arm 2 and the vehicle body or subframe. Spring separating elements 51, 52, often referred to as spring plates, are provided at the ends of the spiral spring 5 to isolate the spiral spring 5 relative to the lower control arm 2 and the vehicle body or subframe.

The wheel suspension may also include a damper unit 6, which as shown, is attached between the wheel carrier 1 and the vehicle body or frame. In the exemplary embodiment, the damper unit 6 connects at its lower end via a joint element 63 to the wheel carrier 1. Connecting the damper unit 6 to the wheel carrier 1 improves damper transmission. While connecting the damper unit 6 to the lower control arm 2 may provide a compact design in the vertical direction such a connection reduces damper transmission.

An upper fastening for the damper unit 6 is integrated in a damper mounting 61. This damper mounting 61 may be screwed onto the vehicle body or frame. A stop damper 62 arranged concentrically around a damper rod attaches to the damper mounting 61. Optionally a valve unit may connect to the damper unit 6 when, for example, the damper unit 6 is a switchable or continuously adjustable damper system.

The drive shaft 7 attaches between the hub and wheel bearing unit 11 and a rear drive unit (not shown) in a conventional manner and drives the rear wheels. A stabilizer rod 8 attaches to the vehicle body or frame, typically through bushings and/or clips. For example, a left-hand clip 81, wherein a further clip is provided on the right-hand side of the motor vehicle, not shown. The stabilizer rod 8 connects to the wheel carrier 1 via a downward strut 82. On the opposing wheel suspension associated with right-hand rear wheel, a further downward strut is provided for connecting the stabilizer rod 8 to the opposing wheel carrier.

In the disclosed embodiment, the lower end of the downward strut 82 and the lower joint element 63 of the damper unit 6 are connected at a common connecting point to the wheel carrier 1. This is implemented by a common screw connection in order to reduce costs and weight, in addition to assembly time.

The stabilizer rod 8 and the downward strut 82 are connected together via a transverse bolt 9 as seen, for example, in FIG. 3. This view also shows the connection of the lower control arm 2 to the wheel carrier 1. As shown the wheel carrier 1 has a fork-like shape in its lower region having with two side portions 14, 16. A tubular region 25 of the lower control arm 2 is received in this fork between the side portions 14, 16 to mount the lower control arm 2 via the two lateral joints 23, 24 on the wheel carrier 1. The connection further shown in FIG. 5. A connecting portion of the wheel carrier 1 extending between the two side portions 14, 16 of the fork and below the control arm 2 is shown located below the tubular region 25.

The position of the spiral spring 5 and the damper unit 6 relative to the wheel center 10 of the wheel carrier 1 is shown in FIG. 4. The wheel center 10 is located in the center of the hub and wheel bearing unit 11, i.e. in the region of the axis of the drive shaft 7. These two components of the wheel suspension are located, when viewed in the direction of travel shown by arrow X, behind the wheel center 10. The lower control arm for supporting the spiral spring 5 having a depression 26, see FIG. 2. In a plan view of the exemplary embodiment, the lower control arm 2 has trapezoidal shape, wherein it connects by the two joints 21, 22 at the wider end to the vehicle body or subframe while mounted via the tubular region 25 at the narrower end in the fork-like portion of the wheel carrier 1.

Figure 1:
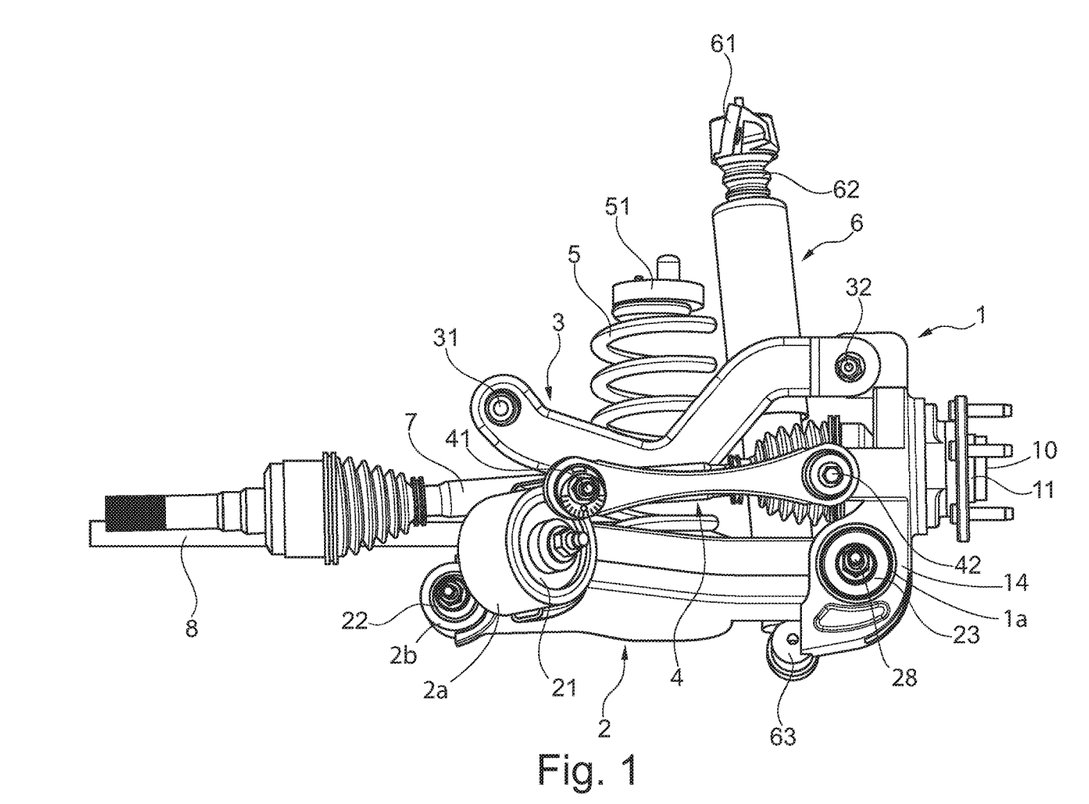
FIG. 1 is a front view of an exemplary embodiment of a suspension for a left rear wheel of a motor vehicle.
Figure 2:
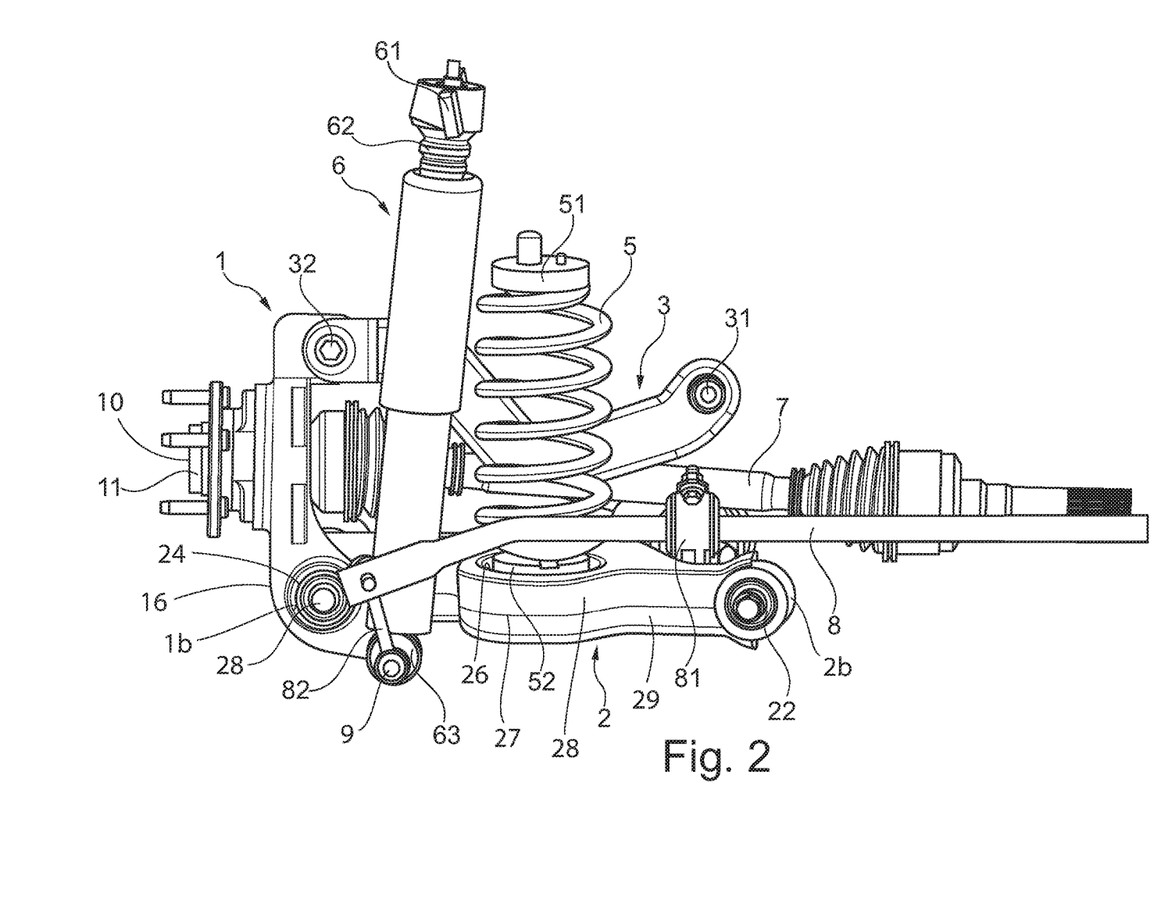
FIG. 2 is a rear view of the suspension of FIG. 1.
Figure 5:
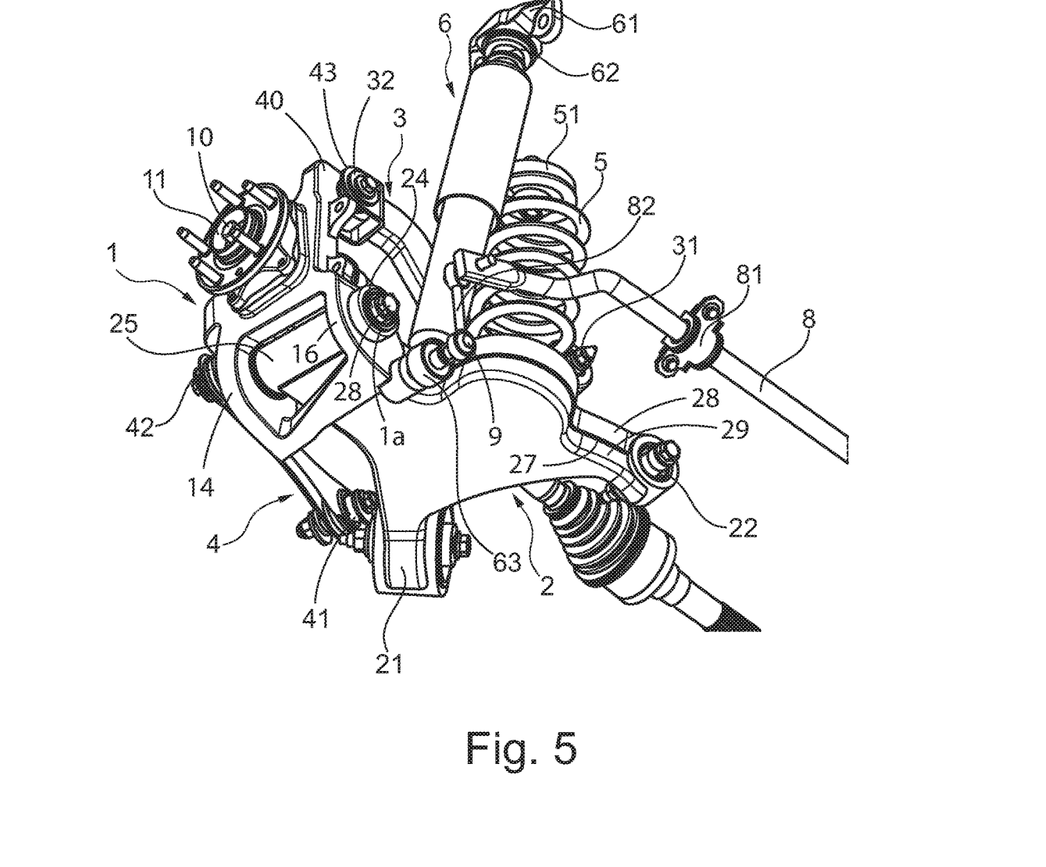
FIG. 5 is a perspective view from below of the suspension of FIG. 1.

In particular, FIGS. 2 and 5 show the lower control arm 2 formed in two parts wherein the control arm 2 is formed by an upper and lower housing half divided by part line 27. In each case the upper and/or the lower part of a receiver for the joints 21 and 22 is formed in both halves. Also, the tubular region 25 may be formed by two corresponding half shells in the two control arm halves. In this case, the tubular region 25 may also be formed by a separate tubular positioned between the two control arm halves.

As set forth herein, the exemplary embodiment is directed to a motor vehicle suspension having a wheel carrier 1 for attaching a rear wheel to the motor vehicle. The wheel carrier 1 is connected via at least one upper camber link 3, a lower control arm 2, and a lateral toe link 4 to the vehicle body or subframe. A horizontally extending stabilizer rod 8 connects to the wheel carrier 1. In addition, the wheel suspension includes a damper unit 6 and a spring unit 5. The stabilizer rod 8 and the damper unit 6 are connected to the wheel carrier 1 at a common connecting point leading to material and weight savings relative to two separate connecting points. In addition, the common connection point saves assembly time, since only one connection has to be made for the common connection.

In one embodiment, the stabilizer rod 8 in this case includes a downward strut 82, protruding downwardly and connected to the wheel carrier 1. The connecting point on the downward strut 82. As shown, the downward strut 82 extends at an angle to the stabilizer rod eight in the direction of this connecting point. In the exemplary embodiment, the common connecting point for the stabilizer rod 8 and the damper unit 6 is located on the wheel carrier 1 at a point as low as possible between the damper unit 6 and the wheel carrier 1.

In addition, the wheel suspension component is arranged such that the upper camber link 3, when viewed in the direction of travel X, is located between the spring unit 5 and a drive shaft 7 for driving a rear wheel.

The damper unit 6 and the spring unit 5 are attached between a component of the wheel suspension and the vehicle body and/or subframe. The damper unit 6 may be attached to different components of the wheel suspension. As illustrated, in the disclosed embodiment, the damper unit 6 is attached to the wheel carrier 1 together with the stabilizer rod 8. In addition, the spring unit, typically formed by a spiral spring, is also attached to the wheel carrier achieving damper transmission of almost 1; however, in an additional embodiment, the damper unit 6 is attached to the wheel carrier 1, while the spring unit 5 is attached to the lower control arm 2. Even when the spring unit 5 is attached to the lower control arm 2, the lower control arm 2 may be designed in a simple and cost-effective manner. The damper unit 6 in this case is preferably arranged as far down as possible on the wheel carrier 1 in order to achieve an efficient vertical suspension system.

The lower control arm 2 is configured as a whole to be lightweight and cost-effective, wherein the connecting points to the vehicle body or subframe and the wheel carrier may be configured to be sufficiently stable. In one embodiment, the lower control arm 2 may comprise a tubular region 25 via which it is connected to the wheel carrier 1. In particular, the lower control arm 2 may be connected to the wheel carrier 1 via two joints 23, 24 located on opposing sides of this tubular region 25. The tubular region 25 is preferably partially surrounded by the structure of the wheel carrier 1. For example, by a fork-shaped region on the wheel carrier 1 with two side portions 14, 16, the tubular region 25 of the lower control arm 2 received between the side portions 14, 16. The tubular region 25 of the lower control arm 2 may be shaped by the structure of the control arm 2 itself. In one embodiment, the tubular region 25 is formed by a separate tubular structure incorporated in the lower control arm 2.

The lower control arm 2 is preferably connected via two joints 21, 22 to the vehicle body or subframe. The lower control arm 2 may have a trapezoidal configuration, wherein at its wider end it is connected via the two joints 21, 22 to the vehicle body or subframe and at its narrower end is connected via the tubular region 25 and the two joints 23, 24 to the wheel carrier 1.

The lower control arm 2 may be formed as a two-part metal housing with two connecting points to the vehicle body or subframe and a further elongated structure for connecting to the wheel carrier 1. The lower control arm may alternatively also be configured as an aluminum cast part.

The connecting elements between the lower control arm 2, upper camber link 3, lateral toe link 4, the wheel carrier 1 and/or the vehicle body or subframe may be configured as rubber bearing bushes or ball joints. The associated connecting elements may be pressed into the respective component and then connected, for example, via screws and nuts to a respective component.

In this manner, the invention provides a weight-optimized and cost-optimized rear wheel suspension with bearing bushings.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A wheel suspension comprising:
a wheel carrier;
an upper camber link;
a lower control arm;
a lateral toe link;
a horizontally extending stabilizer rod;
a damper;
a spring unit wherein said stabilizer rod and said damper unit connect to said wheel carrier at a common point; and
said upper camber link is located between said spring unit and a drive shaft.

2. The wheel suspension of claim 1 wherein said damper and said spring unit, viewed in a forward direction of travel, are arranged behind a wheel center.

3. The wheel suspension of claim 1 wherein said damper unit engages said wheel carrier and said spring unit engages said lower control arm.

4. The wheel suspension of claim 1 including a downward strut, protruding downwardly at an angle from said stabilizer rod, connected on one end to said stabilizer rod and on an opposite end to said wheel carrier at said common point.

5. The wheel suspension of claim 1 wherein said lower control arm includes a tubular region, said tubular region positioned between respective side portions of said wheel carrier.

6. The wheel suspension of claim 5 wherein said lower control arm connects to said wheel carrier via two joints located on the respective side portions of said wheel carrier wherein said tubular region is at least partially surrounded by a portion of said wheel carrier.

7. The wheel suspension of claim 5 wherein said tubular region includes a tubular structure incorporated in said lower control arm.

8. The wheel suspension of claim 1 wherein said lower control arm connects via two joints to a portion of a vehicle.

9. A wheel suspension comprising:
a wheel carrier;
an upper camber link;
a lower control arm;
a lateral toe link;
a horizontally extending stabilizer rod;
a damper;
a spring unit; and
a strut, connected to the stabilizer rod, said strut and damper connected to said wheel carrier at a common point wherein said strut extends at an angle to, and the common point is below, said stabilizer rod.

10. The wheel suspension of claim 9 wherein said damper and said spring unit, in a direction of forward travel, are arranged behind a wheel center.

11. The wheel suspension of claim 9 wherein said damper engages said wheel carrier and said the spring unit engages said lower control arm.

12. The wheel suspension of claim 9 wherein said upper camber link is located between said spring unit and a drive shaft.

13. The wheel suspension of claim 9 wherein said lower control arm includes a tubular region.

14. The wheel suspension of claim 9 wherein said lower control arm connects to said wheel carrier via two joints located on opposing sides of a tubular region of said lower control arm, wherein said tubular region is positioned between respective side portions of said wheel carrier.

15. A wheel suspension comprising:
a wheel carrier;
an upper camber link;
a lower control arm;
a lateral toe link;
a horizontally extending stabilizer rod;
a damper;
a spring unit, said damper and said spring unit, in a direction of forward travel, arranged behind a wheel center, and said damper engages said wheel carrier and said spring unit engages said lower control arm;
a strut, connected to the stabilizer rod, said strut and damper connected to the wheel carrier at a common point wherein said strut extends at an angle to, and the common point is below, the stabilizer rod;
said upper camber link is located between said spring unit and a drive shaft; and
said lower control arm connects to said wheel carrier via two joints located on opposing sides of a tubular region of said lower control arm, wherein said tubular region is positioned between respective side portions of said wheel carrier.

* * * * *

UNITED STATES PATENT AND TRADEMARK OFFICE
CERTIFICATE OF CORRECTION

PATENT NO. : 10,118,452 B2
APPLICATION NO. : 15/485808
DATED : November 6, 2018
INVENTOR(S) : Timothy Drotar et al.

Page 1 of 1

It is certified that error appears in the above-identified patent and that said Letters Patent is hereby corrected as shown below:

In the Claims

Column 6, Line 16, "said strut and damper connected to" should be "said strut and damper directly connected to"

Signed and Sealed this
Second Day of July, 2019

Andrei Iancu
*Director of the United States Patent and Trademark Office*